Sept. 11, 1934.  C. PENATI  1,973,656

MULTIPLE WAY COCK FOR USE IN THE PNEUMATIC CONTROL OF CHANGE SPEED GEARS

Filed Nov. 23, 1933   2 Sheets-Sheet 1

Inventor
Carlo Penati,
By Sommers & Young
attys.

Sept. 11, 1934.  C. PENATI  1,973,656
MULTIPLE WAY COCK FOR USE IN THE PNEUMATIC CONTROL OF CHANGE SPEED GEARS
Filed Nov. 23, 1933  2 Sheets-Sheet 2

Inventor
Carlo Penati,
By Sommers + Young
Attys

Patented Sept. 11, 1934

1,973,656

UNITED STATES PATENT OFFICE 1,973,656

MULTIPLE-WAY COCK FOR USE IN THE PNEUMATIC CONTROL OF CHANGE-SPEED GEARS

Carlo Penati, Turin, Italy, assignor to Fiat Società Anonima, Turin, Italy

Application November 23, 1933, Serial No. 699,472
In Italy December 30, 1932

1 Claim. (Cl. 251—89)

This invention relates to a cock for use in the pneumatic control of the change speed gear of a motor vehicle, more particularly a gear of the sliding pinion type in which the coupling between the primary and the secondary shaft is effected by virtue of an engagement between sets of teeth provided either on the speed gear wheels or on clutch members rigidly connected therewith. In these change speed gears the engagements should take place one at a time and before a further engagement is started the previous one must be wholly released.

In order to operate the change speed gear from two distinct points, e. g. from the two ends of a railway or tramway motor vehicle, it should be possible for the cock to take a "closed" position so as to prevent the air admitted at one point from escaping at the other point. Provision should therefore be made in the cock for a "closed" (fully closed) and a "neutral" (fully open) position, as well as for the position corresponding to the "gears" and for intermediate positions for ensuring de-clutching of the engaged "gear" before resuming the "neutral" position or passing to another "gear" position.

According to the present invention this object is attained by the use of a cock of which the plug is a disc rotating on a machined surface having ports, one for each gear, connected with the gear box control cylinders, the disc having a passage therethrough which communicates with the compressed air supply and also having recesses which communicate with the atmosphere, so that by partial rotations of the disc on the machined surface the ports can be connected either all with the atmosphere (neutral position) or all but a selected one with the atmosphere ("geared" position) the one port then being connected with the compressed air supply, or all can be closed (closed position) to the air supply and to the atmosphere.

The accompanying drawings show, by way of example, a cock according to the invention employed in connection with a four speed change gear which may be the gear of our application Ser. No. 681,363 filed July 20, 1933.

Figure 4:
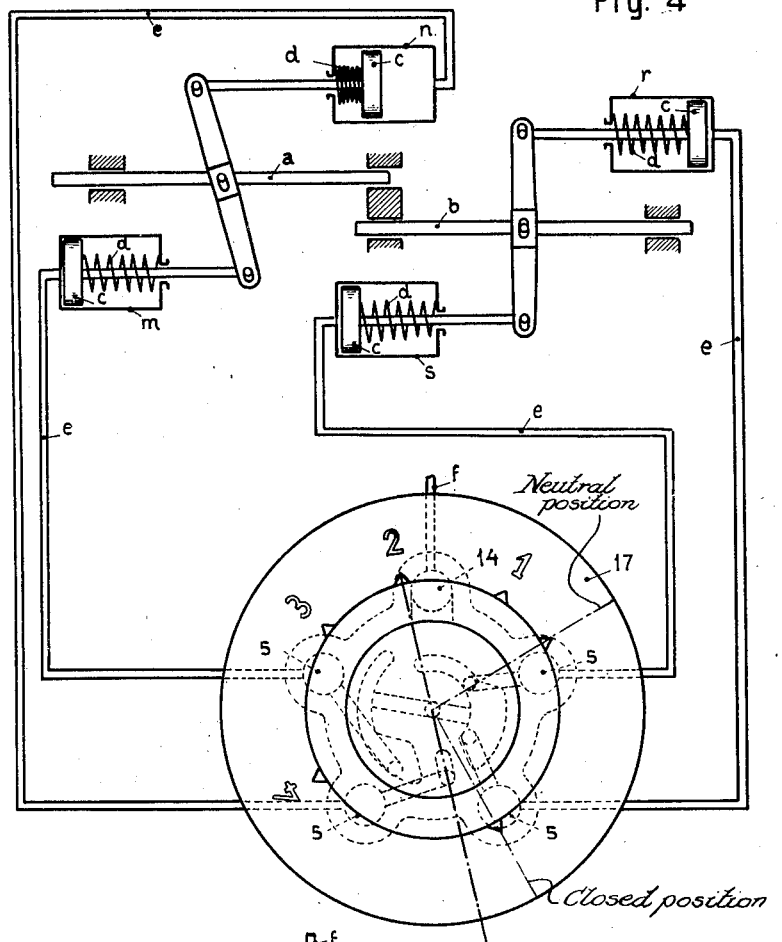

Fig. 4 also shows diagrammatically the controls for the change speed gear.

Referring first more particularly to Fig. 4, each pair of successive speeds (1st and 2nd, 3rd and 4th) is obtained through the displacement of two rods $a$ and $b$, respectively, which are moved in both directions by the pistons $c$ of single-acting cylinders, $m$, $n$, $r$, $s$, which in the position of rest are held at the outer dead points by springs $d$. Each cylinder receives compressed air through a conduit $e$ connecting it to the cock, this conduit also serving for discharging the cylinder by connecting it with the atmosphere through the cock. In the "neutral" position all the cylinders are discharged, that is, they communicate with the atmosphere. In any "geared" position the appropriate cylinder receives compressed air which maintains its piston in the working position or at the inner dead point against the action of its spring $d$, while the other cylinders communicate with the atmosphere. When changing from one speed to the next (upwardly or downwardly) the operative cylinder should be discharged and then the cylinder appropriate to the selected gear should be filled with compressed air. As provision is made for operating the change speed gear from two points, such as the two ends of a motor rail vehicle, by means of two cocks of which the conduits $e$ are connected together in parallel a "closed" position is provided, i. e. a position in which the ends of the conduits at the inoperative cock remain closed. Therefore, for a four speed gear, each cock has six positions (Figs. 4 and 5) namely, "closed" "neutral" "1st speed" "2nd speed" "3rd speed" and "4th speed".

Figure 1:
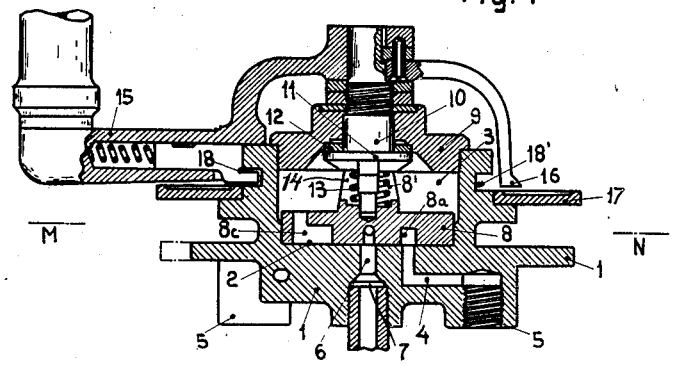
Fig. 1 shows the cock in axial section.
Figure 2:
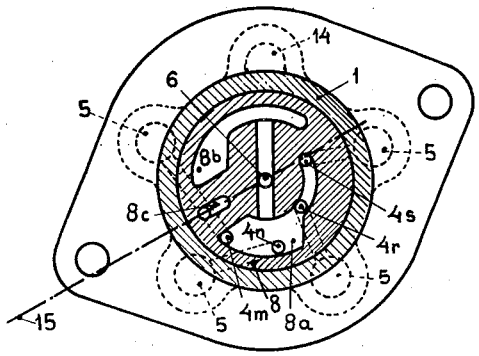
Fig. 2 shows the cock in cross section on the line M—N of Fig. 1.
Figure 3:
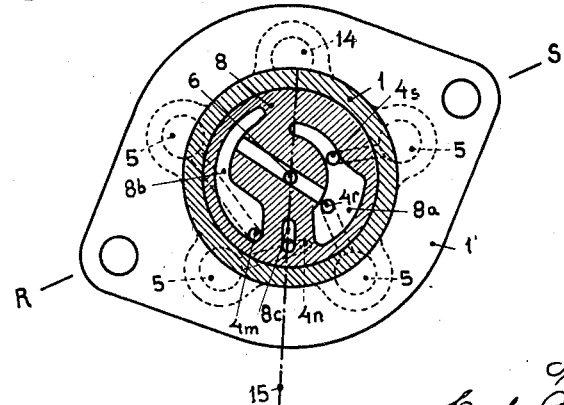
Figs. 3, 4 and 5 show different positions of the cock.

These requirements are fully met by the cock shown in Figs. 1, 2 and 3. The cock body 1, adapted to be fixed to a support or bracket by means of its flange 1', presents a cylindrical chamber 3 having a circular machined surface 2 on which open ports $4m$, $4n$, $4r$ and $4s$. These ports communicate by ducts with distributing branches 5 disposed circumferentially about the cock body and to which the pipes $e$ (Fig. 4) of the control cylinders $m$, $n$, $r$ and $s$ are respectively connected. Another port 6 opens at the centre of the machined surface 2 and has connected thereto, at 7, a discharge pipe open to the atmosphere. A disc 8 rotates on the machined surface and works in a cylindrical seat, this disc controlling the delivery of compressed air to the various conduits 4 and constituting the plug for the cock. The chamber 3 in the cock body constantly communicates with the compressed air supply tank by means of a tube $f$ (Figs. 4 and 5) connected to a distributing branch 14 on the cock body.

The said chamber 3 is closed in air-tight manner by a screw cap 9 through which extends a pin 10 for turning the disc 8. This pin 10 carries a plate 11 capable of rotating on a packing 12 of the cap 9, a spring 13 compressed between the plate 11 and the disc 8 causing the plate to engage the packing 12 and the disc 8 closely to engage the machined surface 2. The disc 8 has radial wings 8' which engage grooves in the plate 11, so that rotation of the pin 10 causes rotation of the disc.

One operating handle is provided for the two cocks, and provision is made whereby it can be removed from the one or the other only when it is set to the "closed" position. 15 denotes this handle or crank, which in all the figures except Fig. 1 is simply represented by a dot-and-dash line. The crank (Fig. 1) is removably fitted on the pin 10, which is held by means of a nut and lock-nut to the cap 9, and carries a pointer 16 moving over a dial 17 secured to the body 1 of the cock. The body 1 is formed with a circular groove 18' in which slides the spring-urged tooth 18 of the crank, which tooth snaps into a recess in each of its operative positions, with the exception of the "closed" position where the groove 18' is formed with an opening for the tooth 18 to permit the attachment or detachment of the crank in the manner of a bayonet joint. Resilient stops are also provided for the intermediate positions to enable the temporary de-clutching of the engaged gear.

The ports 4m, 4n, 4r, 4s, for the four gears are arranged in pairs on two circumferences of different diameter on one half of the machined surface (Fig. 2). The disc 8 is provided in its lower face with recesses 8a and 8b shaped as shown and disposed one on each side of a diameter, said recesses communicating by means of a diametral duct with the central port 6 which constantly connects them with the atmosphere.

In the "neutral" position (Fig. 2) the narrow portion of the recess 8a is opposite the ports 4r and 4s, while its larger portion is opposite the ports 4m and 4n. By suitably turning the disc 8 the recess 8b can be brought over the ports 4m and 4n, or the larger portion of said recess can be brought over the ports 4r and 4s. A small radial passage 8c extends through the disc 8 between the two above mentioned recesses 8a, 8b and is constantly open to the compressed air supply.

When the disc 8 is displaced from the "neutral" position to engage a gear, the recess 8a is removed from the ports 4m, 4n, 4r, 4s successively, and the port last left by the recess comes under the intermediate radial passage 8c, while the port in advance of that one is brought under the recess 8b which (like the recess 8a) communicates with the atmosphere. Therefore, one only out of the four cylinders receives compressed air while the other three cylinders communicate with the atmosphere, as clearly shown in Fig. 4. This figure diagrammatically shows the condition of the pneumatic circuits in the second gear position.

The ports are so spaced from one another that as the disc 8 rotates from one gear position to the next upper or lower gear position and before compressed air is admitted into the next cylinder, the cylinder previously operated has had time to become fully discharged. One of these intermediate positions is shown in Fig. 3.

Figure 5:
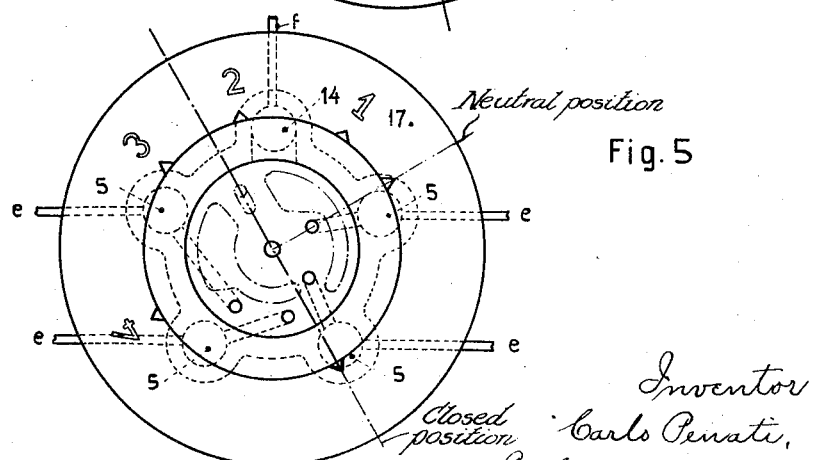

If the "closed" position hereinbefore mentioned were not required, the recesses 8a and 8b could have a constant width (radially measured) over the whole arc of a circle. It is the necessity of providing a closed position which has led to the development of the special shape of the recesses 8a and 8b. Fig. 5 shows how in the "closed" position of the disc 8 none of the ports 4m, 4n, 4r, 4s communicate with the compressed air supply or with the atmosphere. The shape of the recesses and the positioning of the ports are such that in changing from one gear to the other a short interval in an "intermediate" position occurs which insures that only one cylinder at a time receives compressed air.

The change speed gear control is very easy and there is no possibility of errors in operation. Obviously the constructional details may be varied without departing from the scope of this invention.

What I claim is:

For the pneumatic control of the change speed gear of a motor vehicle, a multiple-way cock comprising a circular casing adapted to be placed in communication with a source of pressure fluid, in the bottom whereof four conduits are formed opening inside the casing by pairs on two circumferences of different diameters and adapted to be connected with the change gear speeds controlling members, and a central conduit communicating with the atmosphere, a disc mounted for rotation in an air-tight manner on the bottom of said chamber and having a radial passage communicating with the upper portion of the casing and two recesses communicating together and with the central conduit on the casing bottom, said recesses having a restricted portion adapted to co-operate with the pair of conduits on the casing bottom arranged on the circumference of smaller diameter and an enlarged portion adapted to cooperate with both pairs of conduits on the bottom of the casing, so that by the partial rotation of the disc the conduits can be placed in communication either all with the atmosphere (neutral position) or all but a selected one with the atmosphere (geared position) the one port then being connected with said radial passage, or all can be closed (closed position) both to the compressed air supply and to the atmosphere, a closing cover for said casing and a hand-operated lever mounted on said cover for rotating said disc.

CARLO PENATI.